US009028321B2

(12) United States Patent
Anderson et al.

(10) Patent No.: US 9,028,321 B2
(45) Date of Patent: May 12, 2015

(54) AUTOPLAY MECHANISM FOR WAGERING GAME SYSTEMS

(75) Inventors: Peter R. Anderson, Glenview, IL (US); Brian J. Barclay, Atlanta, GA (US); Andrew C. Guinn, Chicago, IL (US); Richard B. Robbins, Glenview, IL (US); Richard T. Schwartz, Chicago, IL (US)

(73) Assignee: WMS Gaming, Inc., Waukegan, IL (US)

( * ) Notice: Subject to any disclaimer, the term of this patent is extended or adjusted under 35 U.S.C. 154(b) by 536 days.

(21) Appl. No.: 13/386,275

(22) PCT Filed: Jul. 21, 2010

(86) PCT No.: PCT/US2010/042813
§ 371 (c)(1), (2), (4) Date: Apr. 9, 2012

(87) PCT Pub. No.: WO2011/011556
PCT Pub. Date: Jan. 27, 2011

(65) Prior Publication Data

US 2012/0184353 A1 Jul. 19, 2012

Related U.S. Application Data

(60) Provisional application No. 61/227,585, filed on Jul. 22, 2009.

(51) Int. Cl.
*A63F 13/00* (2014.01)
*G07F 17/32* (2006.01)

(52) U.S. Cl.
CPC ............ *G07F 17/32* (2013.01); *G07F 17/3262* (2013.01)

(58) Field of Classification Search
CPC .............. G07F 17/3225; G07F 17/326; G07F 17/3269; G07F 17/3276
USPC ................................................ 463/16, 20, 25
See application file for complete search history.

(56) References Cited

U.S. PATENT DOCUMENTS

| | | | |
|---|---|---|---|
| 6,244,957 | B1 | 6/2001 | Walker et al. |
| 7,476,153 | B2 | 1/2009 | Walker et al. |

(Continued)

FOREIGN PATENT DOCUMENTS

| | | |
|---|---|---|
| WO | WO2011011556 | 1/2011 |

OTHER PUBLICATIONS

"PCT Application No. PCT/US10/42813 International Preliminary Report on Patentability", Oct. 11, 2011, 11 pages.

(Continued)

*Primary Examiner* — Omkar Deodhar
*Assistant Examiner* — Allen Chan
(74) *Attorney, Agent, or Firm* — DeLizio Law, PLLC

(57) ABSTRACT

A wagering game system and its operations are described. In some embodiments, the operations include initiating a wagering game title for presentation on a display device of a gaming machine, and receiving, from the gaming machine, player input indicating autoplay settings selected by a player for the wagering game title. The operations include initiating an autoplay mode for the wagering game title in response to receiving an autoplay trigger from the gaming machine, managing the autoplay mode for the player according to the autoplay setting selected by the player, and generating results for each wagering game of the wagering game title played during the autoplay mode. The operations include monitoring game events associated with the wagering games played during the autoplay mode to determine when to stop the autoplay mode, and stopping the autoplay mode for the player based on the autoplay settings selected by the player.

24 Claims, 7 Drawing Sheets

(56) References Cited

U.S. PATENT DOCUMENTS

2003/0119579 A1* 6/2003 Walker et al. .................. 463/20
2004/0235551 A1* 11/2004 Walker et al. .................. 463/16
2007/0077978 A1 4/2007 Walker et al.
2008/0214286 A1* 9/2008 Lutnick et al. .................. 463/25
2008/0214287 A1* 9/2008 Lutnick et al. .................. 463/25
2008/0318656 A1 12/2008 Walker et al.

OTHER PUBLICATIONS

"PCT Application No. PCT/US10/42813 International Preliminary Report on Patentability", Oct. 17, 2011 , 11 pages.
"PCT Application No. PCT/US10/42813 International Search Report", Sep. 16, 2010 , 9 pages.

* cited by examiner

AUTOPLAY MECHANISM FOR WAGERING GAME SYSTEMS

RELATED APPLICATIONS

This application claims the priority benefit of U.S. Provisional Application Ser. No. 61/227,585 filed Jul. 22, 2009.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2010, WMS Gaming, Inc.

FIELD

Embodiments of the inventive subject matter relate generally to wagering game systems, and more particularly to an autoplay mechanism for wagering game systems.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

Traditionally, wagering game machines have been confined to physical buildings, like casinos (e.g., major casinos, road-side casinos, etc.). The casinos are located in specific geographic locations that are authorized to present wagering games to casino patrons. However, with the proliferation of interest and use of the Internet, some wagering game manufacturers have recognized that a global public network, such as the Internet, can reach to various locations of the world that have been authorized to present wagering games. Consequently, some wagering game manufacturers have created wagering games that can be processed by personal computing devices and offered via online casino websites ("online casinos").

SUMMARY

In some embodiments, a computer-implemented method comprises initiating a wagering game title for presentation on a display device of a gaming machine; receiving, from the gaming machine, player input indicating autoplay settings selected by a player for the wagering game title; initiating an autoplay mode for the wagering game title in response to receiving an autoplay trigger from the gaming machine; managing the autoplay mode for the player according to the autoplay setting selected by the player; generating results for each wagering game of the wagering game title played during the autoplay mode; monitoring game events associated with the wagering games played during the autoplay mode to determine when to stop the autoplay mode; and stopping the autoplay mode for the player based on the autoplay settings selected by the player.

In some embodiments, the method further comprises generating cumulative autoplay results based on the results generated for each wagering game played during the autoplay mode; and providing the cumulative autoplay results to the gaming machine for presentation on the display device of the gaming machine.

In some embodiments, the method further comprises generating video clips of the wagering games that are played during the autoplay mode.

In some embodiments, the method further comprises receiving, from the gaming machine, autoplay replay options selected by the player; and streaming one or more video clips to the gaming machine to replay one or more wagering games played during the autoplay mode based on the autoplay replay options selected by the player.

In some embodiments, the method further comprises generating a graphical representation of game events detected during the autoplay mode and autoplay replay options; and providing the graphical representation of the game events and the autoplay replay options to the gaming machine for presentation on the display device of the gaming machine.

In some embodiments, said monitoring game events associated with the wagering games played during the autoplay mode to determine when to stop the autoplay mode comprises: detecting a plurality of game events associated with the wagering games played during the autoplay mode; determining whether the autoplay settings selected by the player specify to stop the autoplay mode in response to detecting one or more of the plurality of game events; stopping the autoplay mode if the autoplay settings selected by the player specify to stop the autoplay mode in response to detecting one or more of the plurality of game events; continuing the autoplay mode if the autoplay settings selected by the player do not specify to stop the autoplay mode in response to detecting one or more of the plurality of game events.

In some embodiments, said monitoring game events associated with the wagering games played during the autoplay mode to determine when to stop the autoplay mode comprises: determining that the autoplay settings selected by the player specify to stop the autoplay mode after a predefined duration; monitoring a duration associated with the autoplay mode; stopping the autoplay mode when the duration associated with the autoplay mode matches the predefined duration specified by the player for stopping the autoplay mode.

In some embodiments, said monitoring game events associated with the wagering games played during the autoplay mode to determine when to stop the autoplay mode comprises: determining that the autoplay settings selected by the player specify to stop the autoplay mode in response to the player's account balance reaching a predefined lower threshold or a predefined upper threshold; monitoring the player's account balance during the autoplay mode; stopping the autoplay mode when the player's account balance equals the predefined lower threshold or the predefined upper threshold specified by the player for stopping the autoplay mode.

In some embodiments, the method further comprises monitoring game events associated with the wagering games played during the autoplay mode, and initiating a double up bonus game based on the autoplay settings selected by the player.

In some embodiments, the method further comprises: determining that the autoplay settings selected by the player specify to initiate a double up bonus game during the autoplay mode in response to detecting at least one of a plurality of game events; monitoring game events associated with the wagering games played during the autoplay mode; initiating a double up bonus game during the autoplay mode in response to detecting at least one of the plurality of game events specified by the player during a wagering game; generating results associated with the wagering game based on an outcome of the double up bonus game.

In some embodiments, said initiating an autoplay mode for the player for the wagering game title based on the autoplay setting selected by the player comprises determining a speed of play associated with the autoplay mode based on the autoplay settings selected by the player.

In some embodiments, said initiating an autoplay mode for the player for the wagering game title based on the autoplay setting selected by the player comprises determining a bet amount for each of the wagering games played during the autoplay mode based on the autoplay settings selected by the player.

In some embodiments, a wagering game server comprises: a wagering game management unit configured to initiate a wagering game title for presentation on a gaming machine via a wagering game network, and configured to receive, from the gaming machine, player input indicating autoplay settings selected by a player for the wagering game title. The wagering game server can also include an autoplay unit configured to initiate an autoplay mode for the player in response to receiving an autoplay trigger from the gaming machine, and configured to manage the autoplay mode for the player based on the autoplay settings selected by the player for the wagering game title; generate video clips of each wagering game of the wagering game title that are played during the autoplay mode; and to stop the autoplay mode for the player based on the autoplay settings selected by the player; and streaming one or more video clips to the gaming machine to replay one or more of the wagering games that were played during the autoplay mode based on autoplay replay options selected by the player.

In some embodiments, the autoplay unit is further configured to generate results for each wagering game of the wagering game title played during the autoplay mode; monitor game events associated with the wagering games played during the autoplay mode to determine when to stop the autoplay mode; generate cumulative autoplay results based on the results generated for each wagering game played during the autoplay mode; and provide the cumulative autoplay results to the gaming machine for presentation on the display device of the gaming machine.

In some embodiments, the autoplay unit is further configured to generate a graphical representation of game events detected during the autoplay mode and autoplay replay options; and provide the graphical representation of the game events and the autoplay replay options to the gaming machine for presentation on the display device of the gaming machine.

In some embodiments, a wagering game server comprises: means for initiating an autoplay mode for a player in response to receiving an autoplay trigger from a gaming machine; means for managing the autoplay mode for the player based on autoplay setting selected by the player for a wagering game title; means for generating results for each wagering game of the wagering game title played during the autoplay mode; means for monitoring game events associated with the wagering games played during the autoplay mode to determine when to stop the autoplay mode; means for stopping the autoplay mode for the player based on the autoplay settings selected by the player; and means for generating cumulative autoplay results based on the results generated for each wagering game played during the autoplay mode.

In some embodiments, the wagering game server further comprises means for generating video clips of the wagering games that are played during the autoplay mode.

In some embodiments, the wagering game server further comprises means for receiving, from the gaming machine, autoplay replay options selected by the player; and means for replaying one or more wagering games played during the autoplay mode based on the autoplay replay options selected by the player.

In some embodiments, a computer-implemented method comprises: initiating a wagering game title for presentation on a display device of a gaming machine; receiving, from the gaming machine, player input indicating autoplay settings selected by the player for the wagering game title; initiating an autoplay mode for the player based on the autoplay settings selected by the player; generating video clips of each wagering game of the wagering game title that are played during the autoplay mode; stopping the autoplay mode for the player based on the autoplay settings selected by the player; receiving, from the gaming machine, player input indicating autoplay replay options selected by the player; and providing, to the gaming machine, one or more video clips to replay one or more of the wagering games that were played during the autoplay mode based on the autoplay replay options selected by the player.

In some embodiments, said providing one or more video clips to the gaming machine comprises streaming one or more video clips to the gaming machine to replay one or more of the wagering games that were played during the autoplay mode based on the autoplay replay options selected by the player.

In some embodiments, the method further comprises: monitoring game events associated with the wagering games played during the autoplay mode; generating a graphical representation of the game events detected during the autoplay mode and autoplay replay options; and providing the graphical representation of the game events and the autoplay replay options to the gaming machine for presentation on the display device of the gaming machine.

In some embodiments, the method further comprises: detecting a plurality of game events associated with the wagering games played during the autoplay mode; determining that the autoplay settings selected by the player specify to stop the autoplay mode in response to detecting one or more of the plurality of game events; and stopping the autoplay mode in response to detecting the one or more of the plurality of game events.

In some embodiments, one or more machine-readable media, have instructions stored therein, which when executed by a set of one or more processors, cause the set of one or more processors to perform operations that comprise: initiating an autoplay mode for the player in response to receiving an autoplay trigger from a gaming machine; managing the autoplay mode for the player based on autoplay settings selected by the player for a wagering game title; generating video clips of each wagering game of the wagering game title that are played during the autoplay mode; stopping the autoplay mode for the player based on the autoplay settings selected by the player; and streaming one or more video clips to the gaming machine to replay one or more of the wagering games that were played during the autoplay mode based on autoplay replay options selected by the player.

In some embodiments, the operations further comprise: generating results for each wagering game of the wagering game title played during the autoplay mode; monitoring game events associated with the wagering games played during the autoplay mode to determine when to stop the autoplay mode; generate cumulative autoplay results based on the results generated for each wagering game played during the autoplay mode; and providing the cumulative autoplay results to the gaming machine for presentation on the gaming machine.

In some embodiments, the operations further comprise: generating a graphical representation of game events detected during the autoplay mode and autoplay replay options; and providing the graphical representation of the game events and the autoplay replay options to the gaming machine for presentation on the gaming machine.

BRIEF DESCRIPTION OF THE FIGURES

Embodiments are illustrated in the Figures of the accompanying drawings in which.

DESCRIPTION OF THE EMBODIMENTS

This description of the embodiments is divided into five sections. The first section provides an introduction to some embodiments, while the second section describes example wagering game machine architectures. The third section describes example operations performed by some embodiments and the fourth section describes example wagering game machines in more detail. The fifth section presents some general comments.

Introduction

This section provides an introduction to some embodiments.

Wagering game systems offer wagering game players ("players") entertainment value and the opportunity to win monetary value. In various embodiments, wagering game systems can try to enhance the gaming experience by offering players autoplay features that provide opportunities to win monetary awards while the players are offline or otherwise unavailable. In some implementations, the wagering game system allows a player to customize autoplay settings or preferences to control how the system plays for the player during an autoplay mode. In other words, during an autoplay mode, the wagering game system plays wagering games for the player according to the autoplay settings configured by the player. In one example, depending on the autoplay settings, the wagering game system can play for the player for a predefined duration, can bet a predefined amount in each wagering game, can play wagering games at a predefined speed, etc., as will be further described below with reference to FIGS. 1-5. In some implementations, after the autoplay mode is completed, the wagering game system can offer players the option to review or replay the wagering games that were played during the autoplay mode, e.g., the games where the player won an award, as will be further described below in FIG. 6. It is noted that additional examples of using the autoplay functionality will be described below. It is further noted that the mechanisms and techniques described herein for implementing the autoplay functionality can be implemented in both online wagering game systems and casino floor wagering game systems.

Figure 1:
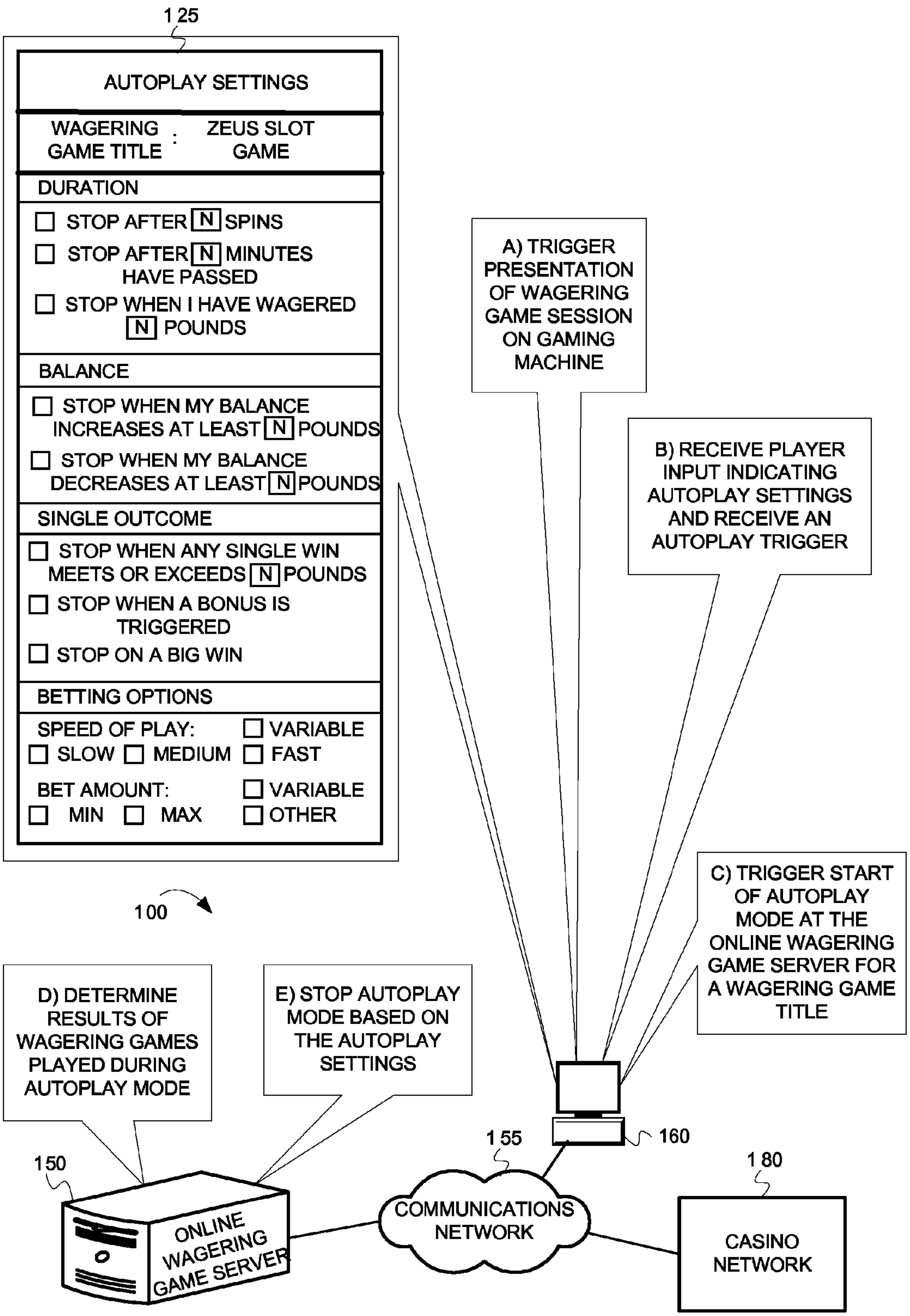
FIG. 1 is a conceptual diagram illustrating an example of implementing the autoplay functionality in a wagering game system, according to some embodiments.

FIG. 1 is a conceptual diagram illustrating an example of implementing the autoplay functionality in a wagering game system, according to some embodiments. In the example shown in FIG. 1, the wagering game system ("system") 100 includes an online wagering game server 150 connected to an online wagering game machine ("gaming machine") 160 via a communications network 155. In some embodiments, the online wagering game server 150 can also connect to a casino network 180, including one or more casino network devices, such as wagering game servers, account servers, wagering game machines, or other devices (not shown).

In one implementation, at stage A, the gaming machine 160 triggers the presentation of a wagering game session on a display device of the gaming machine 160. In one example, the gaming machine 160 receives player input requesting the start of the wagering game session. For example, the gaming machine 160 may receive player input via one or more input devices, e.g., mouse, keyboard, touch screen, etc. In response to receiving the player input, the gaming machine 160 can communicate with the online wagering game server 150 to cause the server 150 to initiate the wagering game session on a display device of the gaming machine 160. For example, the gaming machine 160 can trigger the presentation of a wagering game title selected by the player.

At stage B, the gaming machine 160 receives player input indicating autoplay settings selected by the player. In one implementation, the gaming machine 160 can present an autoplay settings menu 125 on a display device via a graphical user interface (GUI). In one example, the gaming machine 160 can present the autoplay settings menu 125 via a web browser. The player may then select the desired autoplay settings on the autoplay settings menu 125. For example, as illustrated in FIG. 1, the player can select various autoplay settings for a particular wagering game title (e.g., a Zeus-themed wagering game) that specify the duration of the autoplay mode, balance-related autoplay settings, autoplay settings relating to single game outcomes, autoplay settings that specify bet options during the autoplay mode, among others. The gaming machine 160 can also receive player input that includes an autoplay trigger. In one example, the autoplay trigger may be generated when the player selects a "start autoplay" button or otherwise provides input instructing the system to initiate an autoplay mode.

At stage C, the gaming machine 160 triggers the start of an autoplay mode at the online wagering game server 150 for a wagering game title selected by the player. In one implementation, the gaming machine 160 can communicate with the online wagering game server 150 to cause the server 150 to initiate the autoplay mode for the selected wagering game title (e.g., the Zeus-themed wagering game). The online wagering game server 150 manages the autoplay mode according to the autoplay settings configured by the player while the player performs other tasks (e.g., surfs the web), or when the player is offline or otherwise unavailable.

At stage D, the online wagering game server 150 determines results of the wagering games that are played during the autoplay mode. In some implementations, the online wagering game server 150 determines the results based, at least in part, on random numbers generated at the online wagering game server 150. The online wagering game server 150 can store the results for presentation to the player at a later time. In some implementations, the online wagering game server 150 can also store video clips of the wagering games that were played during autoplay mode. The online wagering game server 150 can use the video clips to replay one or more of the wagering games at the gaming machine 160 for the player, as will be further described below.

At stage E, the online wagering game server 150 determines when to stop the autoplay mode based on the autoplay settings configured by the player. For example, the online wagering game server 150 stops the autoplay mode after a certain duration, after a particular balance is reached, or after a specified outcome. The online wagering game server 150 then generates the cumulative autoplay results for presentation to the player at a later time, as will be further described below.

It is further noted that in other implementations, similar to the online example described above, wagering game machines and wagering game servers in the casino network 180 may offer players the autoplay functionality described herein while the players are unavailable.

Although FIG. 1 describes some embodiments, the following sections describe many other features and embodiments.

Operating Environment

This section describes example operating environments and networks and presents structural aspects of some embodiments. More specifically, this section includes discussion about wagering game system architectures.

Wagering Game System Architectures

Figure 2:
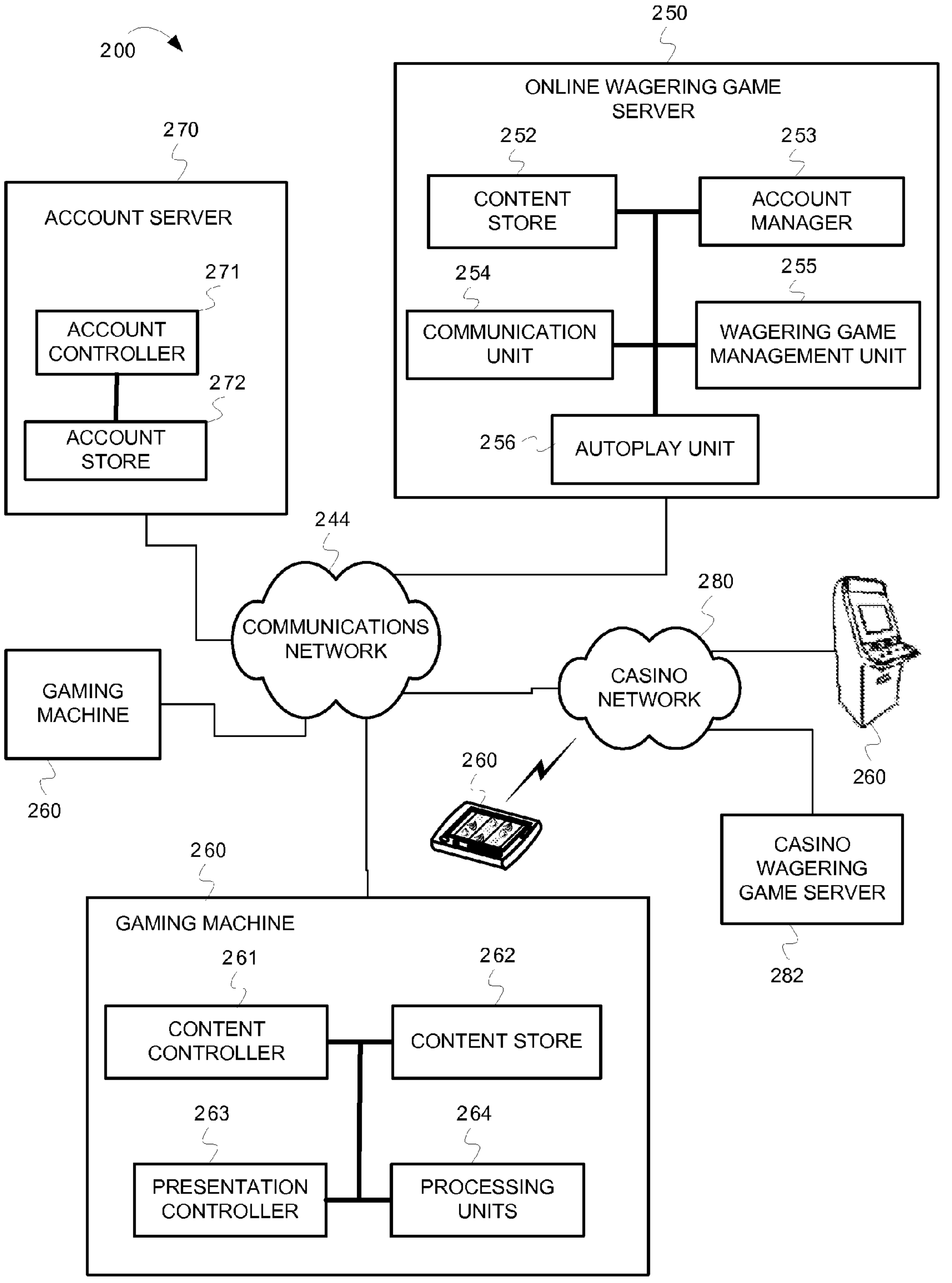
FIG. 2 is a conceptual diagram that illustrates an example of a wagering game system architecture, according to some embodiments.

FIG. 2 is a conceptual diagram that illustrates an example of a wagering game system architecture 200, according to some embodiments. The wagering game system architecture 200 can include an online wagering game server 250 configured to control online wagering game content, provide wagering game results (e.g., random numbers), and communicate wagering game information, account information, and other information to and from a plurality of gaming machines 260. The online wagering game server 250 can include a content store 252 containing content for presenting game results and other game events on the gaming machines 260. The online wagering game server 250 can also include an account manager 253 configured to control information related to player accounts. For example, the account manager 253 can provide wager amounts, game results amounts (e.g., win amounts), bonus game amounts, etc., to an account server 270. The online wagering game server 250 can also include a communication unit 254 configured to communicate information from the server's components to the gaming machines 260, other systems, devices, and networks (e.g., the casino network 280). For example, the communication unit 254 can exchange information with community wagering game servers, account servers, social networking servers, file sharing servers, etc.

The online wagering game server 250 further includes a wagering game management unit 255 configured to facilitate presentation of wagering games on each gaming machine 260. For example, the wagering game management unit 255 can generate and provide game results to a gaming machine 260 for presentation on a display device of the gaming machine 260. The wagering game management unit 255 can also generate random numbers and provide them to the gaming machine 260 so that the gaming machine 260 can generate game results.

The online wagering game server 250 further includes an autoplay unit 256 configured to implement the autoplay functionality described herein. In some implementations, the autoplay unit 256 can allow players to configure autoplay settings (e.g., via one or more autoplay setting menus) for one or more wagering game titles and can store autoplay settings configured by players. The autoplay unit 256 can manage an autoplay mode for players based on the autoplay settings configured by the players. The autoplay unit 256 can also generate cumulative autoplay results and provide other autoplay result features, e.g., autoplay replay options, as will be further described below.

The wagering game system architecture 200 can include a plurality of gaming machines 260 configured to communicate with the online wagering game server 250 to control and present online wagering games and other game-related content. For example, each game machine 260 can present online wagering games and other game-related content on a display device (e.g., screen, monitor, etc.) of the game machine 260. The gaming machines 260 can be various types of systems, e.g., a personal computer (PC), a mobile device, a laptop computer, a netbook, etc. Each gaming machine 260 can include a content controller 261 configured to manage and control content and presentation of the online wagering games on the gaming machine 260. Each gaming device 260 can also include a content store 262 configured to store content to present on the gaming machine 260. Each gaming device 260 may further include a presentation controller 263 configured to control the presentation of the online wagering games and other game-related content (e.g., autoplay setting menu, cumulative autoplay results, etc.) on the gaming machine 260. The presentation controller 263 can include a web browser, browser plug-ins, and any other software and/or hardware suitable for presenting audio and video content. In some embodiments, the presentation controller 263 can present game results using content stored locally in the content store 262. However, in some instances the presentation controller 263 may receive, from the server 250, content for presenting game results, or the controller 263 may request particular content from other network devices. The gaming machine 260 can also include processing components 264 (e.g., microprocessor, memory, bus, etc.) configured to operate in concert with the gaming machine's other components.

The wagering game system architecture 200 can include an account server 270 configured to control player-related accounts accessible via wagering game networks. The account server 270 can manage player financial accounts (e.g., performing funds transfers, deposits, withdrawals, etc.) and player information (e.g., avatars, screen name, account identification numbers, social contacts, financial information, etc.). The account server 270 can also provide auditing capabilities, according to regulatory rules, and track the performance of players, machines, and servers. The account server 270 can include an account controller 271 configured to control information for player accounts. The account server 270 can also include an account store 272 configured to store information for player accounts.

The wagering game system architecture 200 can also include a casino network 280 comprising a casino wagering game server 282 and a plurality of gaming machines 260, e.g., wired and/or wireless casino floor wagering game machines. Similar to the online wagering game server 250, the casino wagering game server 282 can include a content store, an account manager, a communication unit, a wagering game management unit, and an autoplay unit to control wagering game content, provide wagering game results, communicate wagering game information, account information, and other information to and from the one or more casino floor gaming machines 260. Similar to the online implementation, the autoplay unit of the casino wagering game server 282 can implement the autoplay functionality described herein (e.g., managing an autoplay mode based on customized autoplay settings, presenting cumulative autoplay results, replaying wagering games played during an autoplay mode, etc.) for players while the players are unavailable.

Each component shown in the wagering game system architecture 200 is shown as a separate and distinct element connected via the communications network 244. However, some functions performed by one component could be performed by other components. For example, the online wagering game server 250 can also be configured to perform functions of the account server 270. Furthermore, the components shown may all be contained in one device, but some, or all, may be included in, or performed by multiple devices, as in the configurations shown in FIG. 2 or other configurations not shown. Furthermore, the wagering game system architecture 200 can be implemented as software, hardware, any combination thereof, or other forms of embodiments not listed. For example, any of the network components (e.g., the wagering game machines, servers, etc.) can include hardware and machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Operations

This section describes operations associated with some embodiments. In the discussion below, the flow diagrams will be described with reference to the block diagrams presented above. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 3:
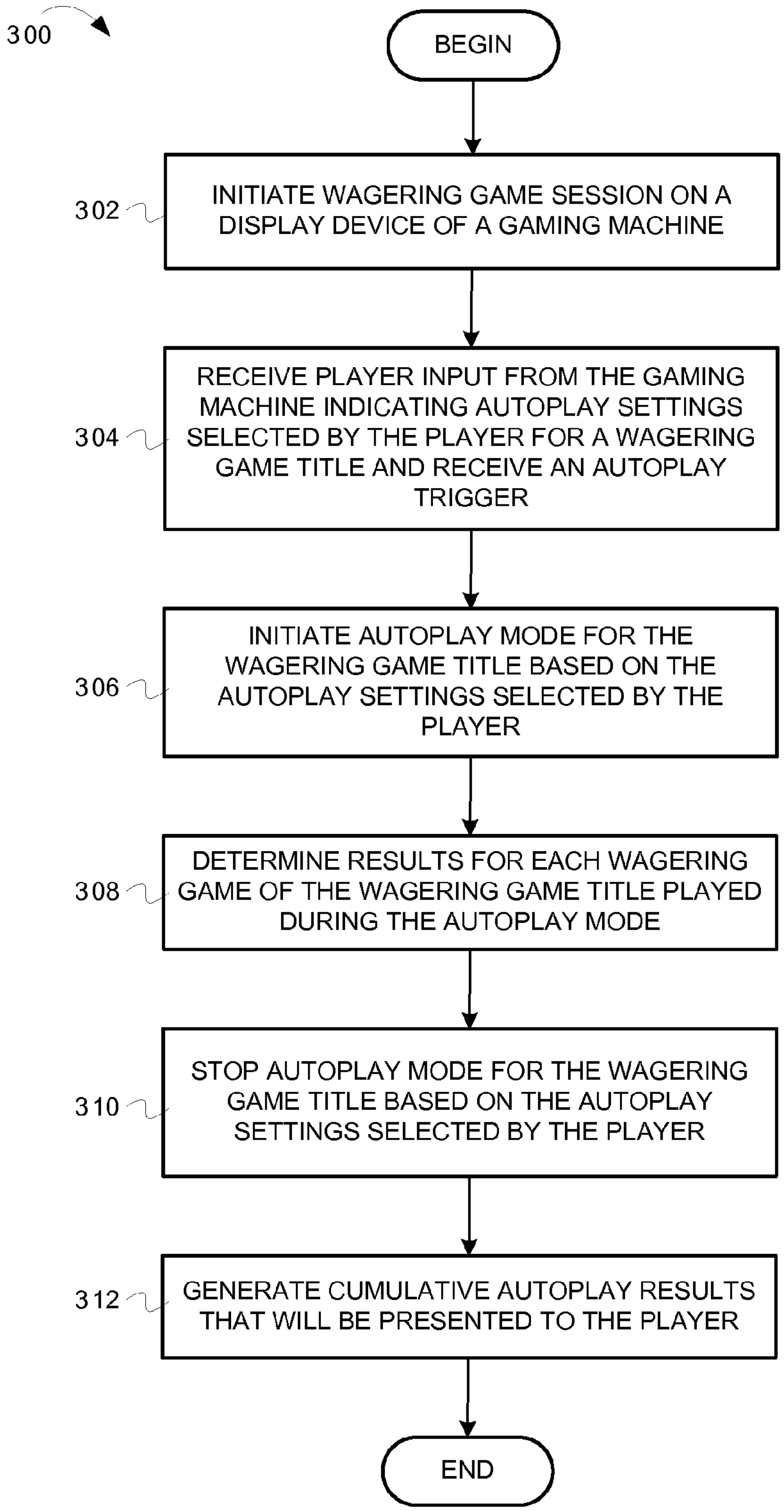
FIG. 3 is a flow diagram illustrating operations for implementing the autoplay functionality in a wagering game system, according to some embodiments.
Figure 4:
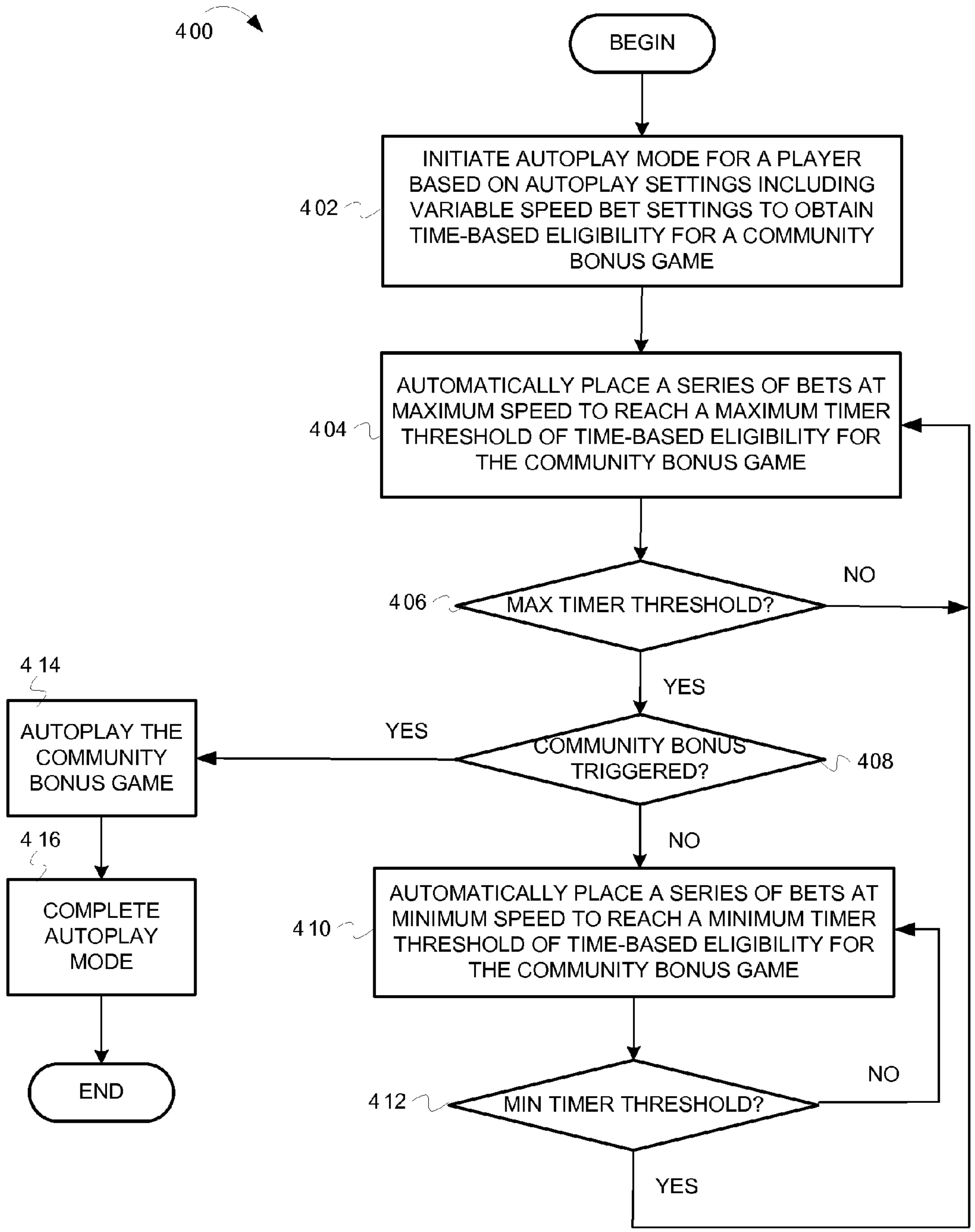
FIG. 4 is a flow diagram illustrating example operations for managing an autoplay mode for a player based on autoplay settings configured by the player including variable bet speed settings, according to some embodiments.
Figure 5:
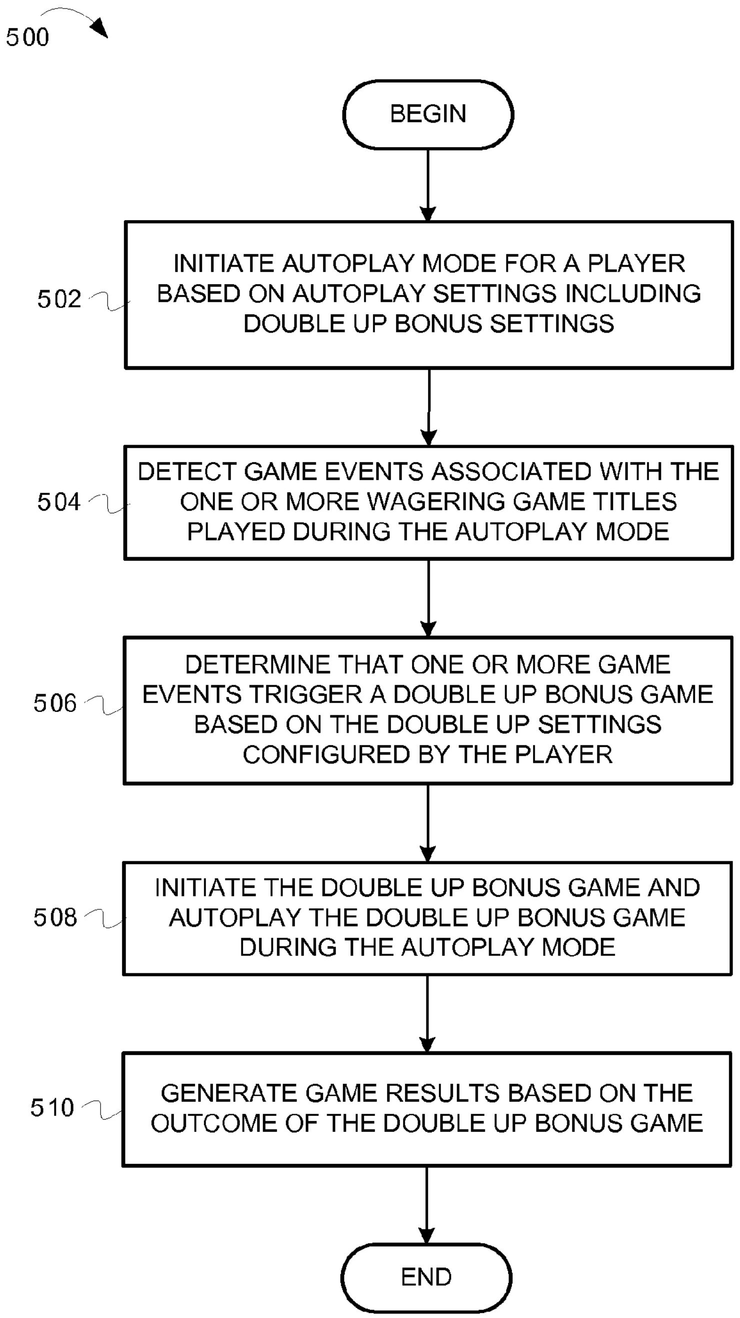
FIG. 5 is a flow diagram illustrating operations for managing an autoplay mode for a player based on autoplay settings configured by the player including double up bonus settings, according to some embodiments.
Figure 6:
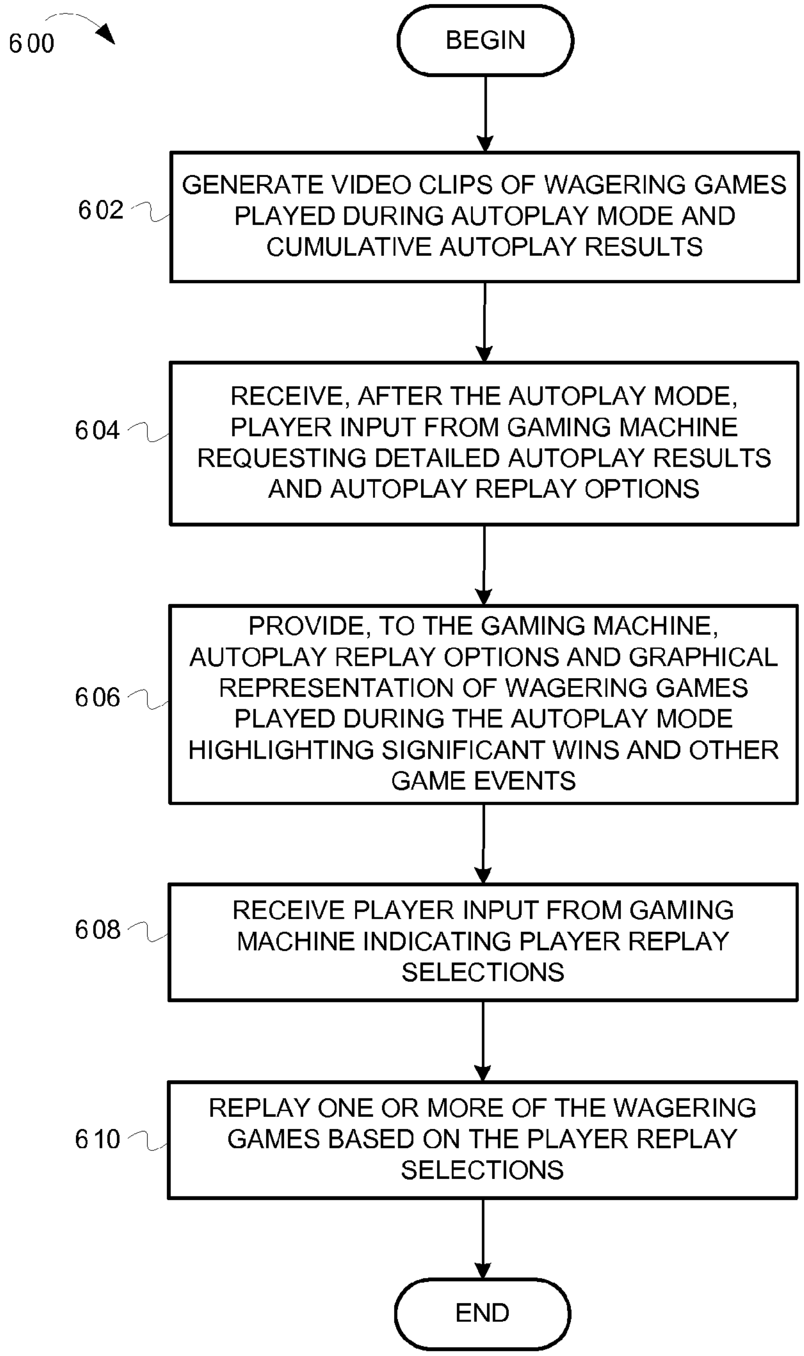
FIG. 6 is a flow diagram illustrating operations for replaying wagering games that are played during an autoplay mode for a player, according to some embodiments.

The following discussion of FIGS. 3-5 describes example mechanisms for implementing the autoplay functionality in a wagering game system. FIG. 6 describes an example mechanism for replaying wagering games that were played during an autoplay mode.

FIG. 3 is a flow diagram ("flow") 300 illustrating operations for implementing the autoplay functionality in a wagering game system, according to some embodiments. The flow of 300 will be described with reference to the example system architecture of FIG. 2. The flow diagram begins at block 302.

At block 302, the online wagering game server 250 initiates a wagering game session on a display device of a gaming machine 260. In one example, the online wagering game server 250 initiates the wagering game session in response to receiving player input from the gaming machine 260, e.g., login information, a selection of a wagering game title, etc. The wagering game management unit 255 may use the login information and other account information received from the gaming machine 260 to find and access the player's account in the account server 270. The wagering game management unit 255 may then initiate a wagering game title for presentation on the display device of the gaming machine 260. After block 302, the flow continues at block 304.

At block 304, the online wagering game server 250 receives player input from the gaming machine 260 indicating autoplay settings selected by the player for a wagering game title. The autoplay unit 256 may receive autoplay settings that specify the duration of the autoplay mode for the wagering game title. For example, the autoplay settings may indicate to stop the autoplay mode after a certain amount of time, after a certain number of wagering games, or after a specified amount of money is wagered. The autoplay unit 256 may receive balance-related autoplay settings. For example, the autoplay settings may indicate to stop the autoplay mode when a certain minimum or maximum balance is reached. The autoplay unit 256 can receive autoplay settings relating to single game outcomes. For example, the autoplay settings can indicate to stop the autoplay mode when a single win meets or exceeds a certain award amount, when a bonus game is triggered, or when a "big win" is detected. In some implementations, a "big win" can be defined as any win where the monetary value that is awarded is at least 20 times the bet amount. It is noted, however, that in other implementations a big win can be defined differently, e.g., any win of monetary value that is at least 50 times or 100 times the bet amount, or any win that is greater than or equal to a predefined amount (e.g., $250 or $500).

The autoplay unit 256 can also receive autoplay settings that specify bet options during the autoplay mode. For example, the autoplay settings can set a bet amount for the wagering games that are played during the autoplay mode (e.g., a min bet amount, a max bet amount, a specified bet amount). The autoplay settings can also specify the speed of play during the autoplay mode. The autoplay unit 256 can also receive autoplay settings that specify conditional or variable settings for the autoplay mode, e.g., as will be further described below with reference to FIG. 4. It is noted that in other implementations the online wagering game server 250 may offer players the option to configure autoplay settings to play multiple wagering game titles during an autoplay mode. For example, the autoplay unit 256 may receive autoplay settings that specify to play a first wagering game title for a first duration, a second wagering game title for a second duration, and a third wagering game title for a third duration. In another example, the autoplay unit 256 may receive autoplay settings that cause the autoplay unit 256 to play a first wagering game title until a specified minimum or maximum balance is reached, and play a second wagering game title until a bonus game is triggered.

The online wagering game server 250 can also receive an autoplay trigger from the gaming device 160. The autoplay trigger can instruct the online wagering game server 250 to initiate the autoplay mode for the player. In one implementation, the autoplay unit 256 may receive the autoplay trigger, and may access the player's configured autoplay settings to determine how to manage the autoplay mode for the player. After block 304, the flow continues at block 306.

At block 306, the online wagering game server 250 initiates the autoplay mode for the wagering game title based on the autoplay settings selected by the player. In one implementation, the autoplay unit 256 communicates with the wagering game management unit 255 to manage the autoplay mode for the player while the player is offline or otherwise unavailable. For example, the autoplay unit 256 can provide inputs and make selections associated with wagering games to play the wagering games for the player according to the configured autoplay settings. In one specific example, for slot wagering games, the autoplay unit 256 can provide a "spin" trigger and a bet amount to the wagering game management unit 255 so that the wagering game management unit can start the slot game and generate random numbers to determine the game results. After block 306, the flow continues at block 308.

At block 308, the online wagering game server 250 determines results for each wagering game of the wagering game title played during the autoplay mode. In some implementations, the wagering game management unit 255 generates random numbers and determines the game results based, at least in part, on the random numbers. The autoplay unit 256 can store the game results for presentation to the player at a later time. In other implementations, the wagering game management unit 255 can provide the results to the gaming machine 260 so that the gaming machine 260 can determine the game results. In some implementations, the autoplay unit 256 can generate and store video clips of the wagering games that are played during the autoplay mode to offer the player the option to replay some or all of the wagering games at a later time, e.g., when the player logs on to the system, as will be further described below with reference to FIG. 6. For example, the player can replay wagering games in which the player won an award. After block 308, the flow continues at block 310.

At block 310, the online wagering game server 250 determines whether to stop the autoplay mode based on the autoplay settings configured by the player. For example, the autoplay unit 256 can stop the autoplay mode after a certain duration. In one implementation, the autoplay unit 256 can maintain a timer during the autoplay mode, and can determine whether to stop the autoplay mode after each wagering game is played by determining whether the timer has counted up to a predetermined time or has counted down to zero. The autoplay unit 256 can similarly keep a count of the number of wagering games that are played and/or can keep track of the amount of money that is wagered to determine whether to stop the autoplay mode. In another example, the autoplay unit 256 can stop the autoplay mode when the balance of the player's account reaches particular amount. In one implementation, the autoplay unit 256 can monitor the player's account balance, and determine whether to stop the autoplay mode based on whether the balance reaches a predefined minimum or maximum balance amount. Similarly, in another example, to determine when to stop the autoplay mode, the autoplay unit 256 can monitor game outcomes and other game events to detect whether certain specified game outcomes or events (e.g., when a single win meets or exceeds a certain award amount, when a bonus game is triggered, etc.) take place during the autoplay mode. After block 310, the flow continues at block 312.

At block 312, the online wagering game server 250 generates the cumulative autoplay results that will be presented to the player. In one implementation, the autoplay unit 256 generates the cumulative autoplay results based on the results of all the wagering games played during the autoplay mode. For example, the autoplay unit 256 can sum all the game results and generate the cumulative autoplay results. In some implementations, the autoplay unit 256 can also generate a graphical representation of the results of the wagering games that were played during the autoplay mode. For example, the autoplay unit 256 can generate a graphical timeline, a histogram, or other visual representation for the results. In some examples, the autoplay unit 256 can generate video clips for each of the wagering games that are played during the autoplay mode. The autoplay unit 256 can include a symbol or other graphical indicator on the graphical representation of the results to indicate that a video clip is available for the wagering games. Furthermore, the autoplay unit 256 can generate an autoplay replay mechanism that allows the player to replay some or all of the wagering games that were played during the autoplay mode, as will be further described below with reference to FIG. 6. After block 312, the flow ends.

It is noted that in some implementations the autoplay unit 256 may be distributed across the wagering game system 200, e.g., across the online wagering game server 250 and the gaming machines 260. In other words, a gaming machine 260 may include a client autoplay application that performs some of the autoplay functionality along with the autoplay unit at the online wagering game server 250. In some implementations, the wagering game management unit 255 may also be distributed across the online wagering game server 250 and the gaming machines 260.

FIG. 4 is a flow diagram ("flow") 400 illustrating example operations for managing an autoplay mode for a player based on autoplay settings configured by the player including variable bet speed settings, according to some embodiments. In some implementations, the online wagering game server 250 may allow players to configure conditional or variable autoplay settings for various wagering game titles. In one example, the online wagering game server 250 can offer wagering games that provide incentives to players based on the speed of play, i.e., the speed at which bets are placed to play the wagering games. For instance, the online wagering game server 250 can award players a bonus game (e.g., a community bonus game) for placing bets at a relatively fast speed. In one example, the online wagering game server 250 can maintain a timer that counts up to a maximum timer threshold when the player places bets at a maximum speed, and counts down to a minimum timer threshold when the player does not place bets at a maximum speed. In this example, the maximum and minimum timer thresholds are the upper and lower thresholds, respectively, that determine whether the player is eligible to participate in a community bonus game when the community bonus game is randomly triggered. In this example, the online wagering game server 250 may allow a player to configure the autoplay settings to bet at varying speeds (e.g., minimum, maximum, and intermediate speeds) to maintain the time-based eligibility of the player for the community bonus, and to stop the autoplay mode after participating in the community bonus. In another example, in addition to maintaining a timer to determine time-based eligibility based on the speed of play, the online wagering game server 250 can award a player a multiplier for the results of the community bonus game based on the speed of play, e.g., the average speed of play. In this example, the online wagering game server 250 may allow a player to configure the autoplay settings to bet at a particular average speed to be eligible to earn a specific multiplier for the community bonus game, as will be further described below. The flow of 400 will be described with reference to the example system architecture of FIG. 2. The flow diagram begins at block 402.

At block 402, the online wagering game server 250 initiates an autoplay mode for a player based on autoplay settings including variable speed bet settings configured by the player. For example, the autoplay unit 256 initiates an autoplay mode and controls the speed a wagering game title is played (i.e., the speed at which bets are placed) according to the variable speed bet settings to obtain time-based eligibility for the community bonus game. In some implementations, eligibility for the community bonus game can be offered to a plurality of players across a plurality of gaming machines 260 in the communications network 244. In some implementations, the wagering game management unit 255 can maintain the timer that counts up and counts down to the maximum and minimum timer thresholds, respectively. After block 402, the flow continues at block 404.

At block 404, the online wagering game server 250 automatically places a series of bets at a maximum speed to reach a maximum timer threshold of time-based eligibility for the community bonus game. For example, the autoplay unit 256 can place a series of bets at maximum speed until the autoplay unit 256 detects that the timer being maintained by the wagering game management unit 255 reaches the maximum timer threshold. After block 404, the flow continues at block 406.

At block 406, the online wagering game server 250 determines whether the timer has reached the maximum timer threshold. For example, if the autoplay unit 256 determines that the time has not reached the maximum timer threshold, the flow loops back to block 404, and the autoplay unit 256 continues to place bets at maximum speed. If the autoplay unit 256 determines that the timer has reached the maximum timer threshold, the flow continues at block 408.

At block 408, the online wagering game server 250 determines whether a community bonus game has been triggered. It is noted that the online wagering game server 250 can monitor whether the community bonus game has been triggered at any point during the process illustrated in the flow diagram 400. In one implementation, the wagering game management unit 255 randomly triggers the community bonus game and determines which of a plurality of players are eligible to participate in the community bonus game. In this example, since the autoplay unit 256 has maintained time-based eligibility for the player, if the community bonus game is triggered, the flow continues at block 414, where the autoplay unit 256 initiates autoplay of the community bonus game for the player. If the community bonus game is not triggered, the flow continues at block 410.

At block 410, the online wagering game server 250 automatically places a series of bets at a minimum speed to reach a minimum timer threshold of time-based eligibility for the community bonus game. For example, the autoplay unit 256 can place a series of bets at minimum speed until the autoplay unit 256 detects that the timer being maintained by the wagering game management unit 255 reaches the minimum timer threshold. After block 410, the flow continues at block 412.

At block 412, the online wagering game server 250 determines whether the timer has reached the minimum timer threshold. For example, if the autoplay unit 256 determines that the time has not reached the minimum timer threshold, the flow loops back to block 410, and the autoplay unit 256 continues to place bets at minimum speed. If the autoplay unit 256 determines that the timer has reached the minimum timer threshold, the flow loops back to block 404, wherein the autoplay unit 256 starts to place bets at maximum speed to maintain the timer between the maximum and minimum timer thresholds and thereby maintain the time-based eligibility for the community bonus game.

At block 414, when the community bonus game is randomly triggered during the process illustrated in the flow 400, the wagering game management unit 255 determines that the player is eligible for the community bonus game, and the autoplay unit 256 initiates autoplay of the community bonus game for the player. The wagering game management unit 255 then generates the results of the community bonus game. After block 414, the flow continues at block 416.

At block 416, the online wagering game server 250 completes the autoplay mode for the player. In some implementations, the autoplay unit 256 detects the results of the community bonus game and completes the autoplay mode for the player. In other implementations, the autoplay unit 256 may continue the autoplay mode to gain eligibility for another community bonus game, or continue the autoplay mode according to the autoplay settings configured by the player, e.g., as described above with reference to FIG. 3. After block 416, the flow ends.

In another example, in addition to maintaining a timer to determine time-based eligibility based on the speed of play, the online wagering game server 250 can award a player a multiplier for the results of the community bonus game based on the average speed of play. The faster the player places bets during a wagering game session, the larger the multiplier the player is awarded. For example, the wagering game management unit 255 can award a 2×, 3×, 4×, etc. multiplier to a player based on the player's speed of play. The multiplier can multiply the award the player is provided for participating in the community bonus game. In one example, the autoplay unit 256 may allow a player to configure the autoplay settings to bet at a particular average speed to be eligible to earn a specific multiplier for the community bonus game. For example, if the player configures the autoplay settings to be eligible for a 2× multiplier, the autoplay unit 256 can bet at the required average speed to be eligible for the 2× multiplier when the community bonus game is triggered.

In some implementations, the online wagering game server 250 can be programmed to play picking bonus games for the player during the autoplay mode based on the autoplay settings configured by the player. For example, the autoplay unit 256 can generate random numbers and make selections in a picking bonus game based on the random numbers. In another example, the autoplay unit 256 can make selections in a picking bonus game based on historical information, e.g., past selections by the player in that specific picking bonus game. In yet another example, the autoplay unit 256 can make selections in a picking bonus game based on the most common selections that have been made by all the players of the system 200 for that specific picking bonus game.

In some implementations, the autoplay unit 256 can be programmed with conditional autoplay settings. For example, the autoplay settings can specify if a first outcome is obtained in a first wagering game title, then play a second wagering game title until a second outcome is obtained, and if the second outcome is obtained in the second wagering game title, then play a third wagering game title until a third outcome is obtained, and then stop the autoplay mode. For example, the autoplay settings can specify to play a poker game until a certain amount of money is won, then play a roulette game until five games are won, and then play a slots game until the autoplay unit 256 plays fifty games of the slots game, and then stop the autoplay mode. It is noted that various other conditional autoplay settings for various wagering game titles can be configured by the player.

FIG. 5 is a flow diagram ("flow") 500 illustrating operations for managing an autoplay mode for a player based on autoplay settings configured by the player including double up bonus settings, according to some embodiments. The flow of 500 will be described with reference to the example system architecture of FIG. 2. The flow diagram begins at block 502.

At block 502, the online wagering game server 250 initiates an autoplay mode for a player based on autoplay settings including double up bonus settings. For example, the autoplay unit 256 initiates an autoplay mode and determines when to offer a double up bonus game during the autoplay mode according to the double up bonus settings configured by the player. In some implementations, double up bonus games can include bonus games that are presented after a player has won an award in a wagering game, which offer a "double or nothing" opportunity. In other words, if the player is willing to bet the award the player has won to play the double up bonus game, the bonus game offers the player the opportunity to double the award the player has won. In some implementations, the autoplay unit 256 can offer various double up bonus settings that the player can configure for autoplay purposes. For example, the double up bonus settings can specify to initiate a double up bonus game after a predefined number of wins, after a predefined number of wagering games played, after a predefined amount of time played, after a win that is greater than a predefined monetary amount, and/or after a win that is less than a predefined monetary amount. In other examples, the double up bonus settings can specify to initiate a double up bonus game after predefined game outcomes or other events, e.g., in poker, after every third full house, after every second straight, after every second flush, after each four of a kind, etc.; in blackjack, after every third blackjack, etc. It is noted that the autoplay unit 256 can offer various other configuration options for double up bonus games, e.g., the double up bonus settings can specify to initiate a double up bonus game after detecting a winning picking bonus game, and/or after detecting a sequence of maximum bets. After block 502, the flow continues at block 504.

At block 504, the online wagering game server 250 detects game events associated with the one or more wagering game titles played during the autoplay mode. For example, the autoplay unit 256 communicates with the wagering game management unit 255 to detect game events such as the cards that are dealt, the bonus games that are triggered, the wagering game outcome and awards that are won, etc. After block 504, the flow continues at block 506.

At block 506, the online wagering game server 250 determines that one or more game events trigger a double up bonus game based on the double up bonus settings configured by the player. After block 506, the flow continues at block 508.

At block 508, the online wagering game server 250 initiates a double up bonus game and autoplays the double up bonus game during the autoplay mode. In some implementations, the autoplay unit 256 autoplays the double up bonus game based on the double up bonus settings configured by the player. For example, the player can specify for the autoplay unit 256 to accept an offer to play a double up bonus game as long as the amount bet is less than or equal to a predefined amount. In another example, the double up bonus settings can specify how the autoplay unit 256 is to play the double up bonus games, e.g., using random numbers, using a player's historical play selections (e.g., prior selections the player has made in a picking bonus game), etc. After block 508, the flow continues at block 510.

At block 510, the online wagering game server 250 generates the game results for the wagering game based on the outcome of the double up bonus game. For example, the wagering game management unit 255 doubles the award originally won by the player if the double up bonus game is won during the autoplay mode. However, if the double up bonus game is lost, the wagering game management unit 255 updates the game outcome to indicate the player lost the award originally won due to an unsuccessful double up opportunity. After block 510, the flow ends.

In some implementations, the autoplay unit 256 may allow a player to configure additional double up bonus settings. For example, if the player does not want to wager the full amount that has been won for the double up opportunity, the double up bonus settings can specify a particular amount that the player wants to wager for each double up bonus opportunity, or a particular percentage of the amount won that the player wants to wager. In this example, if the player wins the double up bonus game, the amount wagered is doubled rather than the original amount that was won.

In some embodiments, the online wagering game server 250 may allow a player to save double up bonus opportunities in the player's account to be used at a later time. In one implementation, the player can specify in the double up bonus settings when the autoplay unit 256 should save the double up bonus opportunity and when the autoplay unit 256 should accept the double up bonus opportunity. For example, the autoplay unit 256 can be programmed to save double up bonus opportunities when the amount won is less than or equal to a predefined amount, and to accept the double up bonus opportunity if the amount won is greater than the predefined amount. In one implementation, when a double up bonus opportunity is saved, the player's account is credited with a double up bonus opportunity that can be redeemed for the opportunity to double an award that is won at a later time. In one implementation, the online wagering game server 250 may limit the types of games in which saved double up opportunities can be redeemed (e.g., only poker games), and/or may limit the amount won that can be wagered for a double or nothing opportunity (e.g., up to $250). In one specific example, a double up bonus opportunity where the wager amount (which may be equal to the amount won) is $10 can be saved and used at a later time when the amount wagered for the double up bonus opportunity is $100, for the opportunity to win a larger award.

It is noted that the autoplay functionality described above with reference to FIGS. 3-5 can be implemented with respect to any type of wagering games, e.g., base games, bonus games, side games, etc. In one implementation, for bonus games, the player can configure whether to autoplay bonus games that are triggered, or whether the autoplay mode should stop when a bonus game is triggered, so that the player can play the bonus game when the player is available. In some implementations, the autoplay functionality can be implemented for the player to play multiple wagering games at the same time. For example, the player can play a first wagering game and initiate an autoplay mode to play two additional wagering games at the same time as the first wagering game.

FIG. 6 is a flow diagram ("flow") 600 illustrating operations for replaying wagering games that are played during an autoplay mode for a player, according to some embodiments. The flow of 600 will be described with reference to the example system architecture of FIG. 2. The flow diagram begins at block 602.

At block 602, the online wagering game server 250 generates and stores video clips of wagering games played during an autoplay mode. In one implementation, the autoplay unit 256 generates and stores video clips for the sequence of wagering games played during the autoplay mode. For example, the autoplay unit 256 can generate video of the wagering games using one or more video formats, e.g., AVI, MPEG, WMV, MOV, SWF, etc. Furthermore, as was described above, the autoplay unit 256 can generate the cumulative autoplay results after the autoplay mode is completed. After block 602, the flow continues at block 604.

At block 604, after the autoplay mode, the online wagering game server 250 receives player input from the gaming machine 260 requesting detailed autoplay results and autoplay replay options. In one implementation, after the autoplay mode, the autoplay unit 256 presents the cumulative results of the autoplay mode on a display device of the gaming machine 260. In one example, if the player was offline during the autoplay mode, the autoplay unit 256 presents the cumulative results of the autoplay mode when the player logs in to the wagering game system 200. In another example, if the gaming machine 260 remained connected to the system 200 during the autoplay mode, the autoplay unit 256 presents the cumulative results of the autoplay mode on the gaming machine 260 immediately after the autoplay mode is completed. After viewing the cumulative results, the player may request the detailed autoplay results and the autoplay replay options to review some or all of the activity that took place during the autoplay mode. In one example, in addition to displaying the cumulative results, the autoplay unit 256 can provide the player the option to request a more detailed graphical representation of the results and the autoplay replay options. It is noted, however, that in other implementations the autoplay unit 256 can automatically present the detailed autoplay results and the autoplay replay options when the player views the autoplay results. After block 604, the flow continues at block 606.

At block 606, the online wagering game server 250 provides, to the gaming machine 260, the autoplay replay options and a graphical representation of the wagering games played during the autoplay mode highlighting significant wins and other game events. In one implementation, the autoplay unit 256 can generate a graphical timeline of the wagering games that were played during the autoplay mode. The wins during the autoplay mode can be highlighted using various symbols and/or color coding that can be referenced by a legend. For example, wins of $0-20 can be highlighted in the timeline using a yellow triangle, wins of $21-50 can be highlighted using an orange triangle, and wins of $50+ can be highlighted using a red triangle. In addition, other game events can be highlighted in the timeline, e.g., different levels of losses, bonus games, rare game events (e.g., a royal flush), etc. It is noted, however, that in other examples a detailed version of the autoplay results can be illustrated in various ways, e.g., the autoplay unit 256 can generate a histogram of the wagering games that were played during the autoplay mode illustrating the amount of money that was won or lost in each wagering game.

In some implementations, the autoplay replay options can include a scroll bar on the graphical timeline of the wagering games played during the autoplay mode. The player can scroll through the various video clips of the wagering games that were played during the autoplay mode by moving the scroll bar forward and backwards on the timeline. The player can select a specific wagering game to replay by lining up the scroll bar to the wagering game on the timeline that the player wants to replay. The player can also select which wagering game the player wants to replay by clicking on a specific wagering game on the timeline, or clicking on the symbols illustrated on the timeline indicating significant wins and other game events. In some implementations, the autoplay replay options may also provide the player the option (e.g., via a drop down menu, dialog box, etc.) to specify different criteria for wagering games that the player wants to replay, e.g., replay wagering games with wins of at least a predefined monetary value, all wins in a specified wagering game title, bonus game wins, all wins within a particular range in the timeline of wagering games, losses of a predefined monetary value, etc. It is noted, however, that in other examples various other autoplay replay options can be offered to the player, e.g., the autoplay unit 256 can provide "play", "stop", "rewind", "fastforward", "skip forward", "skip backward", etc. buttons on the interface to allow the player to control how the wagering games are replayed and to move from replaying one wagering game to another. The autoplay unit 256 can stream the autoplay replay options and the graphical representation of the autoplay activity to the gaming machine 260 to cause the gaming machine 260 to present this information via a graphical user interface on a display device. After block 606, the flow continues at block 608.

At block 608, the online wagering game server 250 can receive player input from the gaming machine 260 indicating the player replay selections. In some implementations, the autoplay unit 256 can receive the player input indicating the player replay selections and the autoplay unit 256 can determine which wagering game(s) to replay for the player, whether the player wants to scroll forward or backward on the timeline, and/or other selected replay options. After block 608, the flow continues at block 610.

At block 610, the online wagering game server 250 can replay one or more wagering games that were played during the autoplay mode based on the player replay selections. In some implementations, the autoplay unit 256 can play one or more video clips in a window of the graphical user interface associated with the gaming machine 260 to replay the one or more wagering games according to the player replay selections. In one example, the autoplay unit 256 can stream one or more video clips to the gaming machine 260 to replay the one or more wagering games according to the player replay selections. After the autoplay unit 256 begins to stream one or more video clips or a sequence of video clips (corresponding to a sequence of wagering games that were played during the autoplay mode), the autoplay unit 256 can receive additional player replay selections to adjust the playback of the wagering games. For example, the autoplay unit 256 can receive a request to fast forward through the sequence of video clips, or a request to begin playing a different video clip. After block 610, the flow ends.

Additional Example Operating Environments

This section describes example operating environments, systems and networks, and presents structural aspects of some embodiments.

Wagering Game Machine Architecture

Figure 7:
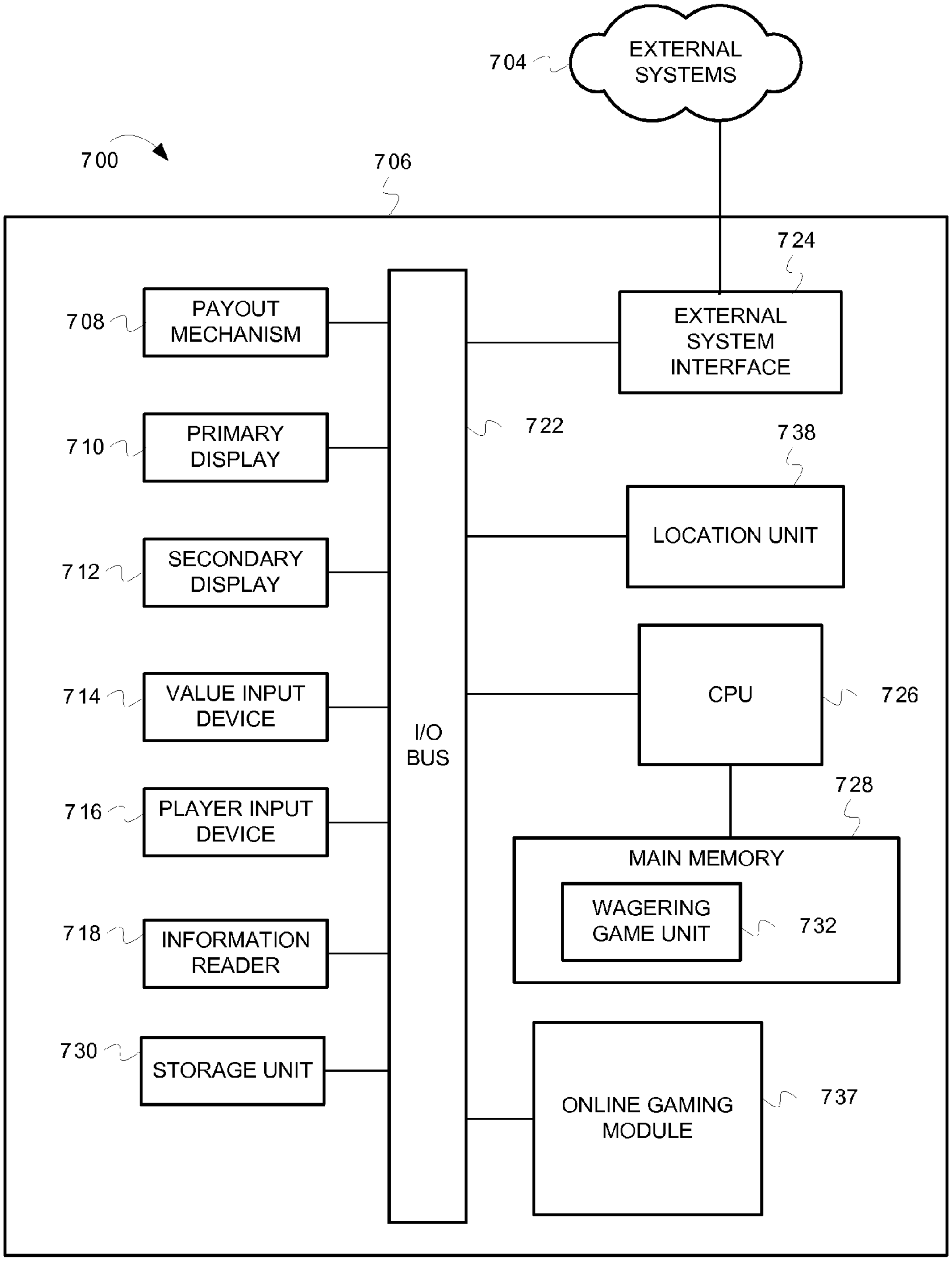
FIG. 7 is a conceptual diagram that illustrates an example of a wagering game machine architecture, according to some embodiments.

FIG. 7 is a conceptual diagram that illustrates an example of a wagering game machine architecture 700, according to some embodiments. In FIG. 7, the wagering game machine architecture 700 includes a wagering game machine 706, which includes a central processing unit (CPU) 726 connected to main memory 728. The CPU 726 can include any suitable processor, such as an Intel® Pentium processor, Intel® Core 2 Duo processor, AMD Opteron™ processor, or UltraSPARC processor. The main memory 728 includes a wagering game unit 732. In some embodiments, the wagering game unit 732 can present wagering games, such as video poker, video black jack, video slots, video lottery, reel slots, etc., in whole or part. The wagering game unit 732 may also implement the autoplay functionality, e.g., as described above with reference to FIGS. 1-6.

The CPU 726 is also connected to an input/output ("I/O") bus 722, which can include any suitable bus technologies, such as an AGTL+ frontside bus and a PCI backside bus. The I/O bus 722 is connected to a payout mechanism 708, primary display 710, secondary display 712, value input device 714, player input device 716, information reader 718, and storage unit 730. The player input device 716 can include the value input device 714 to the extent the player input device 716 is used to place wagers. The I/O bus 722 is also connected to an external system interface 724, which is connected to external systems 704 (e.g., wagering game networks). The external system interface 724 can include logic for exchanging information over wired and wireless networks (e.g., 802.11g transceiver, Bluetooth transceiver, Ethernet transceiver, etc.)

The I/O bus 722 is also connected to a location unit 738. The location unit 738 can create player information that indicates the wagering game machine's location/movements in a casino. In some embodiments, the location unit 738 includes a global positioning system (GPS) receiver that can determine the wagering game machine's location using GPS satellites. In other embodiments, the location unit 738 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 7, in some embodiments, the location unit 738 is not connected to the I/O bus 722.

In some embodiments, the wagering game machine 706 can include additional peripheral devices and/or more than one of each component shown in FIG. 7. For example, in some embodiments, the wagering game machine 706 can include multiple external system interfaces 724 and/or multiple CPUs 726. In some embodiments, any of the components can be integrated or subdivided.

In some embodiments, the wagering game machine 706 includes an online gaming module 737. The online gaming module 737 can process communications, commands, or other information, where the processing can control and present online wagering games. In some embodiments, the online gaming module 737 can work in concert with the wagering game unit 732, and can perform any of the operations described above.

Furthermore, any component of the wagering game machine 706 can include hardware, firmware, and/or machine-readable media including instructions for performing the operations described herein.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A computer-implemented method comprising:

initiating, at a wagering game server of a wagering game system, an autoplay mode for a wagering game session associated with a player for one or more wagering game titles in response to detecting an autoplay trigger;

determining time-based eligibility thresholds, wherein the time-based eligibility thresholds dictate eligibility to participate in a community bonus game of the wagering game system;

determining, based on the time-based eligibility thresholds, a speed of play for the player to be eligible to participate in the community bonus game;

automatically placing, at the speed of play, a plurality of bets for a plurality of wagering games of the one or more wagering game titles that are played during the autoplay mode;

in response to detecting that the community bonus game is triggered in the wagering game system, determining that the wagering game session associated with the player meets the time-based eligibility thresholds to participate in the community bonus game based on said automatically placing, at the speed of play, the plurality of bets; and determining bonus results for the wagering game session associated with the player based on results associated with the community bonus game.

2. The method of claim 1, further comprising:

generating cumulative autoplay results for the wagering game session associated with the player based on results generated for each wagering game played during the autoplay mode; and providing the cumulative autoplay results to a gaming machine associated with the player for presentation on a display device of the gaming machine.

3. The method of claim 1, further comprising generating video clips of the wagering games that are played during the autoplay mode.

4. The method of claim 3, further comprising:

receiving, from a gaming machine associated with the player, autoplay replay options selected by the player; and streaming one or more video clips from the wagering game server to the gaming machine to replay one or more wagering games played during the autoplay mode based on the autoplay replay options selected by the player.

5. The method of claim 1, further comprising:

generating a graphical representation of game events detected during the autoplay mode and autoplay replay options; and providing the graphical representation of the game events and the autoplay replay options to a gaming machine associated with the player for presentation on a display device of the gaming machine.

6. The method of claim 1, further comprising:

detecting a plurality of game events associated with the wagering games played during the autoplay mode;

determining whether autoplay settings selected by the player specify to stop the autoplay mode in response to detecting one or more of the plurality of game events;

stopping the autoplay mode if the autoplay settings selected by the player specify to stop the autoplay mode in response to detecting one or more of the plurality of game events; and continuing the autoplay mode if the autoplay settings selected by the player do not specify to stop the autoplay mode in response to detecting one or more of the plurality of game events.

7. The method of claim 1, further comprising:

determining that autoplay settings selected by the player specify to stop the autoplay mode after a predefined duration;

monitoring a duration associated with the autoplay mode; and stopping the autoplay mode when the duration associated with the autoplay mode matches the predefined duration specified by the player for stopping the autoplay mode.

8. The method of claim 1, further comprising:

determining that autoplay settings selected by the player specify to stop the autoplay mode in response to the player's account balance reaching a predefined lower threshold or a predefined upper threshold;

monitoring the player's account balance during the autoplay mode; and stopping the autoplay mode when the player's account balance equals the predefined lower threshold or the predefined upper threshold specified by the player for stopping the autoplay mode.

9. The method of claim 1, wherein said determining bonus results for the wagering game session associated with the player based on results associated with the community bonus game comprises:

determining a community bonus game multiplier associated with the wagering game session associated with the player based on an average speed of play during the autoplay mode; and determining the bonus results for the wagering game session associated with the player based on the community bonus game multiplier and based on the results associated with the community bonus game.

10. The method of claim 1, further comprising:

determining that autoplay settings selected by the player specify to initiate a double up bonus game during the autoplay mode in response to detecting at least one of a plurality of game events;

monitoring game events associated with the wagering games played during the autoplay mode;

initiating the double up bonus game during the autoplay mode in response to detecting at least one of the plurality of game events specified by the player during one of the wagering games; and generating results associated with the wagering game based on an outcome of the double up bonus game.

11. The method of claim 1, wherein the automatically placing, at the speed of play, a plurality of bets for a plurality of wagering games of the one or more wagering game titles that are played during the autoplay mode comprises:

placing the plurality of bets at a maximum speed of play when an average speed of play for the wagering game session for the player is below the speed of play for the player to be eligible to participate in the community bonus game; and placing the plurality of bets at a minimum speed of play when the average speed of play for the wagering game session for the player is above the speed of play for the player to be eligible to participate in the community bonus game.

12. The method of claim 1, wherein said initiating the autoplay mode for the wagering game session associated with the player for the wagering game title comprises determining a bet amount for each of the wagering games played during the autoplay mode based on autoplay settings selected by the player.

13. A wagering game server comprising:

a wagering game management unit configured to initiate a wagering game title for presentation on a gaming machine via a wagering game network, and configured to receive, from the gaming machine, player input indicating autoplay settings selected by a player for the wagering game title; and an autoplay unit configured to initiate an autoplay mode for the player in response to receiving an autoplay trigger from the gaming machine, and configured to:

determine time based eligibility thresholds, wherein the time-based eligibility thresholds dictate eligibility to participate in a community bonus game;

determine, based on the time-based eligibility thresholds, a speed of play for the player to be eligible to participate in the community bonus game; and automatically place bets, on the player's behalf, for each wagering game of the wagering game title played during the autoplay mode based on the speed of play and the autoplay settings selected by the player for the wagering game title.

14. The wagering game server of claim 13, wherein the autoplay unit is further configured to:

generate results for each wagering game played during the autoplay mode;

monitor game events associated with the wagering games played during the autoplay mode to determine when to stop the autoplay mode;

generate cumulative autoplay results based on the results generated for each wagering game played during the autoplay mode; and provide the cumulative autoplay results to the gaming machine for presentation on a display device of the gaming machine.

15. The wagering game server of claim 13, wherein the autoplay unit is further configured to:

generate a graphical representation of game events detected during the autoplay mode and autoplay replay options; and provide the graphical representation of the game events and the autoplay replay options to the gaming machine for presentation on a display device of the gaming machine.

16. A method comprising:

initiating an autoplay mode for a wagering game session associated with a player for one or more wagering game titles in response to detecting an autoplay trigger;

determining a minimum timer threshold and a maximum timer threshold, wherein the minimum timer threshold and the maximum timer threshold are a lower boundary and an upper boundary for eligibility to participate in a community bonus game;

automatically placing a plurality of bets at variable speeds for a plurality of wagering games of the one or more wagering game titles that are played during the autoplay mode to maintain an eligibility timer between the minimum timer threshold and the maximum timer threshold;

determining that the wagering game session associated with the player is eligible to participate in the community bonus game in response to detecting that the eligibility timer is between the minimum timer threshold and the maximum time threshold when the community bonus game is triggered in the wagering game system;

determining a community bonus game multiplier associated with the wagering game session associated with the player based on an average speed of play during the autoplay mode; and determining bonus results for the wagering game session associated with the player based on the community bonus game multiplier and based on results associated with the community bonus game.

17. The method of claim 16, further comprising generating video clips of the wagering games that are played during the autoplay mode.

18. The method of claim 16, further comprising:

receiving, from a gaming machine, autoplay replay options selected by the player; and replaying one or more wagering games played during the autoplay mode based on the autoplay replay options selected by the player.

19. A system comprising:

a wagering game machine configured to present one or more wagering games during a wagering game session;

a wagering game server comprising, a wagering game management unit configured to initiate a wagering game title for presentation on the wagering game machine via a wagering game network and receive, from the wagering game machine, player input indicating selection of an autoplay mode for the wagering game session;

an autoplay unit configured to initiate the autoplay mode for the wagering game session, and configured to, determine a minimum timer threshold and a maximum timer threshold, wherein the minimum timer threshold and the maximum timer threshold are a lower and an upper boundary for eligibility to participate in a community bonus game; and automatically place a plurality of bets at variable speeds for a plurality of wagering games of the wagering game title played during the autoplay mode to maintain an eligibility timer between the minimum timer threshold and the maximum timer threshold.

20. The system of claim 19, wherein the autoplay unit is further configured to:

generate video clips of the plurality of wagering games that are played during the autoplay mode.

21. The system of claim 19, wherein the wagering game management unit is further configured to:

receive, from the wagering game machine, autoplay options selected by the player.

22. One or more non-transitory machine-readable storage media, having instructions stored therein, which, when executed by one or more processors causes the one or more processors to perform operations that comprise:

initiating an autoplay mode for a player in response to receiving an autoplay trigger from a gaming machine;

determining time-based eligibility thresholds, wherein the time-based eligibility thresholds dictate eligibility to participate in a community bonus game;

determining, based on the time-based eligibility thresholds, a speed of play for the player to be eligible to participate in the community bonus game;

automatically placing, at the speed of play, a plurality of bets for one or more wagering games played during the autoplay mode;

in response to detecting that the community bonus game is triggered, determining that the player is eligible for the community bonus game based, at least in part, on the speed of play; and determining bonus results for the player based on the community bonus game.

23. The one or more non-transitory machine-readable storage media of claim 22, wherein the operations further comprise:

generating results for each of the one or more wagering games played during the autoplay mode;

monitoring game events associated with the one or more wagering games played during the autoplay mode to determine when to stop the autoplay mode;

generate cumulative autoplay results based on the results generated for each of the one or more wagering games played during the autoplay mode; and providing the cumulative autoplay results to the gaming machine for presentation on the gaming machine.

24. The one or more non-transitory machine-readable storage media of claim 22, wherein the operations further comprise:

generating a graphical representation of game events detected during the autoplay mode and autoplay replay options; and providing the graphical representation of the game events and the autoplay replay options to the gaming machine for presentation on the gaming machine.

* * * * *